April 8, 1952  A. W. KOGSTROM  2,591,832
SELF-LUBRICATING RADIAL AND THRUST BEARING
Filed Oct. 4, 1946

INVENTOR.
AXEL W. KOGSTROM
BY
Barnes, Kisselle, Laughlin & Raisch
ATTORNEYS

Patented Apr. 8, 1952

2,591,832

UNITED STATES PATENT OFFICE 2,591,832

SELF-LUBRICATING RADIAL AND THRUST BEARING

Axel W. Kogstrom, Detroit, Mich., assignor to O. & S. Bearing Company, Detroit, Mich., a corporation of Michigan Application October 4, 1946, Serial No. 701,174

6 Claims. (Cl. 287—90)

This invention relates to a self-lubricating radial and thrust bearing and more particularly to a bearing of the ball and socket type. There are many oscillatable joints particularly in automobile chassis which have been provided heretofore with self-lubricating bearings of various constructions, as for example, the patent to Skillman, No. 2,069,781.

It is an object of the present invention to provide an improved self-lubricating bearing in which the load carrying capacity may be maintained or even increased while at the same time greatly reducing the frictional torque on the bearing. Most conveniently, such a bearing may comprise a ball and socket in which the loading is primarily thrust load along the axis of the ball stud.

It is an object to so arrange the bearing material which is lubricant impregnated fibrous composition so that it is distributed at points where it may be most effective in carrying the thrust load and at the same time will produce the least frictional drag.

Figure 1:
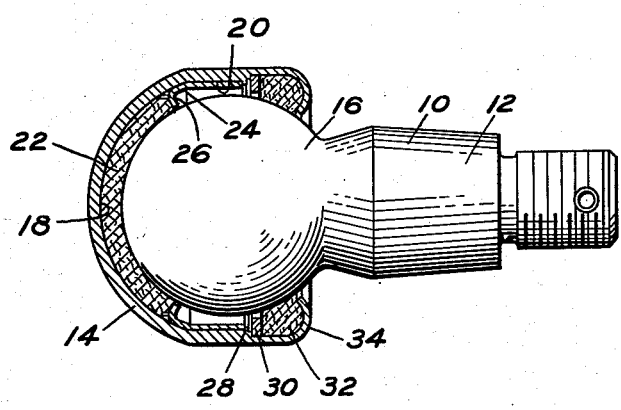
Figure 1 is a longitudinal section of a ball and socket joint incorporating a preferred form of the present invention.
Figure 2:
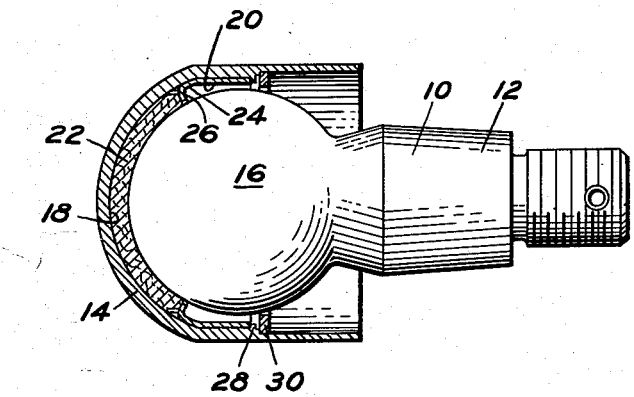
Figure 2 is a view corresponding to Figure 1 showing the joint in a partial stage of completion.

Referring now to the drawing, there is shown a joint comprising a ball stud 10 having the usual tapered and threaded shank 12. A sheet metal socket member 14 is provided complemental to the ball 16 and spaced therefrom. The socket has a generally hemispherical portion 18 and a stepped cylindrical bore 20. The portion 18 is lined with a pad of bearing material 22. The latter may be formed of compressed fibrous material impregnated with a lubricant preferably of the type disclosed in the patent to Delp, No. 2,379,478. Positioned in the cylindrical bore 20 is a sheet metal separator member 24 which fits the bore 20 closely and has a flange 26 turned inwardly to abut the edge of the liner 22. The flange 26 is spaced from the ball 16. The separator 24 is retained in the position illustrated by staking it in place as indicated at 28 and is held tightly against the edge of pad 22 while the staking is conducted. A spacing washer 30 is mounted in the enlarged portion of the bore 20 and abuts a second liner of bearing material 32 which may be of the same composition as the pad 22. The open end of the cylindrical bore 20, shown in Figure 2, is then swaged inwardly to the configuration indicated in Figure 1 at the point 34.

The bearing material of the liners 22 and 32 is preferably compressed to a compact mass and the best results have been obtained when the thrust pad 22 is given a higher compression than the annular ring 32. As indicative of the degree of compression found suitable, the pad 22 may be compressed about 35 per cent of its original volume and the ring 32 compressed about 20 per cent. The separator 24 being rigidly secured in the bore 20 serves to prevent the pad 22 from expanding edgewise and thus greatly assists in maintaining its compression. Likewise, the washer 30, since it abuts against a shoulder in the bore 20, prevents expansion of the ring 32 and in this way both pieces of bearing material are made independent of each other as to possible expansion.

The improved bearing may be used as a ball and socket joint in a wide variety of applications and is particularly adapted to those where the loading is principally a thrust loading. This thrust load is carried by the pad 22 and due to its higher compression than the ring 32, it is able to withstand much higher loading. At the same time, the ball is free of frictional drag at the zone where its diameter is greatest, namely, adjacent the separator 24. In this zone there is little projected area for receiving thrust but a very large area to create frictional drag and the absence of any bearing material in this zone greatly reduces the operating torque of the bearing. At the same time, the liner ring 32 serves to carry a large portion of the radial load and does so without a large frictional drag.

Bearings of this character have excellent thrust capacity, in fact, they have been found eminently suitable for use as king pin bearings in the front wheel suspension of automotive vehicles. The low frictional torque about the axis of the ball stud materially contributes to easy steering while the high thrust capacity of the bearing insures a long life without play or noise. At the same time, the annular bearing pad 32 carries the radial load which is imposed in such applications without excessive friction and at the same time without wear. One major factor contributing to this is the relatively low compression of the fabric in the ring 32.

In addition, the hollow separator 24 serves as a lubricant reservoir which keeps the fabric of both bearing pads supplied with lubricant to replace any lost by evaporation, capillary action or oxidation and materially contributes to the life of the bearing.

I claim:

1. A ball and socket joint subjected to both radial and thrust loads comprising complementary spaced members including a ball stud and a housing, the ball of the stud being located within the housing, a liner of compressed fibrous material impregnated with a lubricant and extending over the spherical end of the ball stud, a rigid spacer element surrounding the waist of the ball and a second liner of compressed fibrous material surrounding the neck of the ball at the stud end, said liners and said spacer being positioned between the ball of the stud and the housing, the first liner being highly compressed to receive principally thrust loading and the second liner being less highly compressed to receive principally radial loading.

2. A ball and socket joint subjected to both radial and thrust loads comprising complementary spaced members including a ball stud and a housing, the ball of the stud being located within the housing, a liner of compressed fibrous material impregnated with a lubricant and extending over the spherical end of the ball stud, a rigid spacer element surrounding the waist of the ball and a second liner of compressed fibrous material surrounding the neck of the ball at the stud end, said spacer being secured to the socket to maintain the first liner against spreading edgewise between the two members, said liners and said spacer being positioned between the ball of the stud and the housing.

3. A ball and socket joint subjected to radial and thrust loads comprising a ball-ended stud, a shell having a hemi-spherical and cylindrical recess to receive said ball, a pad of lubricant impregnated fibrous material to fit in the spherical portion of said recess and interposed between the shell and the free end of the ball, a ring of sheet material interposed between said shell and ball disposed equatorially of said ball and having an inturned radial flange to lie adjacent the peripheral edge of said pad, means on said shell to confine said ring against displacement from said shell, a ring of lubricant impregnated material disposed on said ball within the cylindrical portion of said shell outside of said first ring and means to confine said ring of lubricant impregnated material axially whereby said lubricant impregnated material is confined between said ball and said shell under pressure.

4. A ball and socket joint subjected to radial and thrust loads comprising a ball-ended stud, a shell having a hemi-spherical and cylindrical recess to receive said ball, a pad of lubricant impregnated fibrous material to fit in the spherical portion of said recess and interposed between the shell and the free pole of the ball, a ring of sheet material similarly interposed between said shell and ball disposed equatorially of said ball and lying against said outer shell and an inturned radial flange on said ring to lie against the peripheral edge of said pad having a shorter radial length than the working clearance between said ball and shell, means on said shell to confine said ring against axial displacement from said shell, a ring of lubricant impregnated material disposed on said ball over-center from said free pole within the cylindrical portion of said shell, and means to confine the edges of said last ring to a point within the radial working clearance of the ball whereby said lubricant impregnated material may be under pressure between said shell and said ball.

5. A ball and socket joint subjected to radial and thrust loads comprising a ball-ended stud, a shell having a hemi-spherical and cylindrical recess to receive said ball, a pad of lubricant impregnated fibrous material to fit in the spherical portion of said recess and interposed between the shell and the free pole of the ball, a ring of sheet material similarly interposed between said shell and ball disposed equatorially of said ball and lying against said outer shell and an inturned radial flange on said ring to lie against the peripheral edge of said pad having a shorter radial length than the working clearance between said ball and shell, means on said shell to confine said ring against axial displacement from said shell, a ring of lubricant impregnated material disposed on said ball over-center from said free pole within the cylindrical portion of said shell, and means to confine the edges of said ring of lubricant impregnated material including an annulus confining against axial movement toward said ball and an inturned flange of said shell projecting radially toward said ball, said annulus and said inturned flange having a radial working clearance of the ball whereby said lubricant impregnated material may be under pressure between said shell and ball.

6. A self-lubricating bearing for absorbing both radial and thrust loads comprising an inner member of longitudinally varying contour having an enlarged portion with a reduced portion on each side thereof, an outer member around said inner member relatively rotatable in spaced relation thereto, lubricant impregnated fibrous material compressed between the reduced portions of said inner member and the outer member and comprising separate pieces positioned in spaced relation on said reduced portions and both extending circumferentially of the inner member, and a spacer member of rigid material spaced radially from the inner member and exerting edgewise compressive force on one of said pieces, said spaced member being positioned relative to said piece by the outer member to exert a predetermined compressive force on said one piece, the other of said pieces being retained and compressed against the inner member independently of said spacer member by a portion of the outer member, the compression of the second piece being independent of that of the first piece.

AXEL W. KOGSTROM.

REFERENCES CITED

The following references are of record in the file of this patent:

UNITED STATES PATENTS

| Number | Name | Date |
|---|---|---|
| 897,448 | Blake | Sept. 1, 1908 |
| 1,594,935 | Force | Aug. 3, 1926 |
| 1,842,747 | Crawford et al. | Jan. 26, 1932 |
| 2,083,718 | Kull et al. | June 15, 1937 |
| 2,115,087 | Schaefer | Apr. 26, 1938 |
| 2,181,300 | Flumerfelt | Nov. 28, 1939 |

FOREIGN PATENTS

| Number | Country | Date |
|---|---|---|
| 582,421 | Germany | of 1933 |